US010737202B2

(12) United States Patent
Sharpe et al.

(10) Patent No.: US 10,737,202 B2
(45) Date of Patent: Aug. 11, 2020

(54) ASSEMBLY WITH PIVOTABLE HOPPER AND SHAKER

(71) Applicant: WYO-BEN, INC., Billings, MT (US)

(72) Inventors: Dan Sharpe, Haslet, TX (US); Mike Bliss, Ponder, TX (US)

(73) Assignee: Wyo-Ben, Inc., Billings, MT (US)

( * ) Notice: Subject to any disclaimer, the term of this patent is extended or adjusted under 35 U.S.C. 154(b) by 622 days.

(21) Appl. No.: 15/276,611

(22) Filed: Sep. 26, 2016

(65) Prior Publication Data

US 2017/0087487 A1    Mar. 30, 2017

Related U.S. Application Data

(60) Provisional application No. 62/233,942, filed on Sep. 28, 2015.

(51) Int. Cl.
| | |
|---|---|
| *B01D 33/03* | (2006.01) |
| *E21B 21/06* | (2006.01) |
| *B01D 33/48* | (2006.01) |
| *B01D 33/72* | (2006.01) |
| *B03B 5/02* | (2006.01) |

(52) U.S. Cl.
CPC ......... *B01D 33/0376* (2013.01); *B01D 33/48* (2013.01); *B01D 33/722* (2013.01); *B03B 5/02* (2013.01); *E21B 21/065* (2013.01); *B01D 2201/26* (2013.01)

(58) Field of Classification Search
None
See application file for complete search history.

(56) References Cited

U.S. PATENT DOCUMENTS

| | | | | | |
|---|---|---|---|---|---|
| 2,562,539 | A | * | 7/1951 | Ellis ...................... | B65G 69/00 |
| | | | | | 414/354 |
| 2,636,628 | A | * | 4/1953 | Prang ...................... | B60P 1/16 |
| | | | | | 414/489 |
| 2,756,881 | A | * | 7/1956 | Sims ...................... | B28C 7/068 |
| | | | | | 414/21 |
| 3,191,348 | A | * | 6/1965 | Rampe ................... | B24B 31/06 |
| | | | | | 451/326 |

(Continued)

FOREIGN PATENT DOCUMENTS

| | | |
|---|---|---|
| CA | 2242282 A1 | 7/1998 |
| CN | 203308407 U | 11/2013 |

(Continued)

OTHER PUBLICATIONS

International Search Report, International Application No. PCT/US2016/053805, dated Jan. 6, 2017.

(Continued)

*Primary Examiner* — Robert J Popovics
(74) *Attorney, Agent, or Firm* — Snell & Wilmer, L.L.P.

(57) ABSTRACT

A combined hopper and shaker assembly which can be used at least in processing excavation or other remains. The assembly features a hopper that can be pivoted (through operation of a hoist/sling) to cause the contents of the hopper to be fed via gravity through an exit chute onto the shaker. The hopper includes splash guards or sidewalls on the portions thereof that are proximate the pivot axis and an internal shape along the exit chute so as to guide the contents of the hopper toward the exit chute.

25 Claims, 20 Drawing Sheets

(56) References Cited

U.S. PATENT DOCUMENTS

| | | | | |
|---|---|---|---|---|
| 3,265,232 A * | 8/1966 | Lythgoe | B60P 1/025 | 414/345 |
| 3,378,152 A * | 4/1968 | Warner | B65G 47/18 | 198/582 |
| 3,575,308 A * | 4/1971 | Moon | B60P 1/36 | 414/489 |
| 3,606,050 A * | 9/1971 | Silber | B65G 69/30 | 198/607 |
| 3,700,283 A * | 10/1972 | Birdsall | B60P 1/04 | 298/18 |
| 3,719,298 A * | 3/1973 | Brown | B60P 1/36 | 414/489 |
| 3,800,478 A * | 4/1974 | Rampe | B24B 31/12 | 451/326 |
| 3,844,617 A * | 10/1974 | Kostman | A01D 90/12 | 298/11 |
| 3,923,175 A * | 12/1975 | Landvatter | B60P 1/36 | 193/4 |
| 4,289,068 A * | 9/1981 | Heinrich | B30B 9/3042 | 100/215 |
| 4,299,695 A * | 11/1981 | Bostrom | B07B 1/005 | 209/260 |
| 4,392,769 A * | 7/1983 | Lowery | B65G 65/04 | 14/69.5 |
| 4,483,650 A * | 11/1984 | Sims | B65D 88/56 | 222/166 |
| 4,572,782 A | 2/1986 | Smith | | |
| 4,790,455 A | 12/1988 | Dieringer et al. | | |
| 4,998,625 A * | 3/1991 | Read | B07B 1/28 | 209/234 |
| 5,082,555 A * | 1/1992 | Read | B07B 1/46 | 209/244 |
| 5,106,490 A * | 4/1992 | McDonald | B07B 1/005 | 209/240 |
| RE34,289 E | 6/1993 | McClain | | |
| 5,232,098 A * | 8/1993 | St-Pierre | B07B 1/005 | 209/240 |
| 5,244,098 A * | 9/1993 | Hadden | B07B 1/005 | 209/243 |
| 5,501,343 A * | 3/1996 | Hadden | B07B 1/46 | 209/240 |
| 6,000,553 A * | 12/1999 | Cohen | B07B 1/005 | 209/313 |
| 6,533,946 B2 | 3/2003 | Pullman | | |
| 6,575,304 B2 | 6/2003 | Cudahy | | |
| 6,863,183 B2 * | 3/2005 | Schulte | B01D 33/033 | 209/405 |
| 6,988,624 B2 * | 1/2006 | MacNaughton | B07B 1/005 | 209/315 |
| 7,314,053 B1 | 1/2008 | Stalp | | |
| 7,506,672 B2 * | 3/2009 | Manno | B03B 9/063 | 134/104.4 |
| 7,594,524 B2 * | 9/2009 | DeCollibus | B03B 9/063 | 134/104.4 |
| 7,635,010 B1 * | 12/2009 | Manno | B08B 3/006 | 134/104.4 |
| 7,699,065 B2 * | 4/2010 | Fitzgerald | B03B 9/063 | 134/117 |
| 7,971,726 B2 | 7/2011 | Lewis | | |
| 9,051,137 B2 * | 6/2015 | Meier | B65G 67/24 | |
| 9,114,340 B2 | 8/2015 | Smith | | |
| 9,668,423 B2 * | 6/2017 | Kringstad | A01D 90/10 | |
| 10,017,097 B2 * | 7/2018 | Ozinga | B65G 21/10 | |
| 2009/0226662 A1 * | 9/2009 | Dyczko-Riglin | C08J 3/201 | 428/95 |
| 2011/0042278 A1 * | 2/2011 | Janssen | B03B 5/00 | 209/44.2 |
| 2012/0068381 A1 * | 3/2012 | Troke | B28B 3/027 | 264/319 |
| 2015/0375266 A1 | 12/2015 | Cady | | |
| 2016/0076321 A1 | 3/2016 | Hurst | | |
| 2016/0360704 A1 * | 12/2016 | Kringstad | A01D 90/10 | |
| 2017/0087487 A1 * | 3/2017 | Sharpe | B01D 33/0376 | |
| 2017/0327024 A1 * | 11/2017 | Ozinga | B65G 21/10 | |

FOREIGN PATENT DOCUMENTS

| | | |
|---|---|---|
| CN | 205240782 U | 5/2016 |
| EP | 2052726 A1 | 3/2012 |
| JP | H08131873 A | 5/1996 |
| JP | 2000325886 A | 11/2000 |
| KR | 1020140069396 A | 6/2014 |
| WO | 2016085701 A1 | 6/2016 |

OTHER PUBLICATIONS

Drilling—Mud Circuit (shale shakers)—www.youtube.com/watch?v-yvlp30FnWSU, Nov. 11, 2012.

Tango 400HD2 Mud Recycling System—Kemtron—Elgin Separation Solutions, http://www.qlddrilling.com/files/pdf/Tango_400HD2_Cut_Sheet_2015.pdf.

Kemtron 200HD2 Fluid Recycling System—Elgin Separation Solutions, http://www.elginseparationsolutions.com/assets/kemtron-200hd2-cut-sheet-2016.pdf.

HDD Mud Cleaning System, Mud Recycling/H-Screening, http://www.hscreening.com/mudsystem/hddmudcleaningsystem/, Sep. 14, 2016.

* cited by examiner

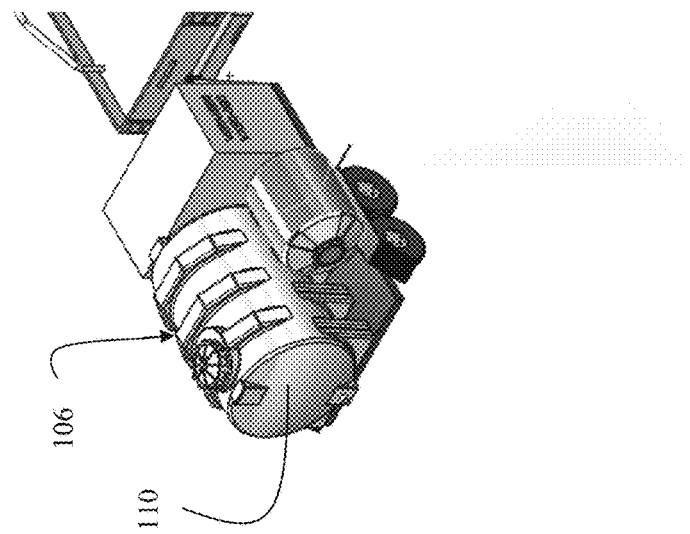
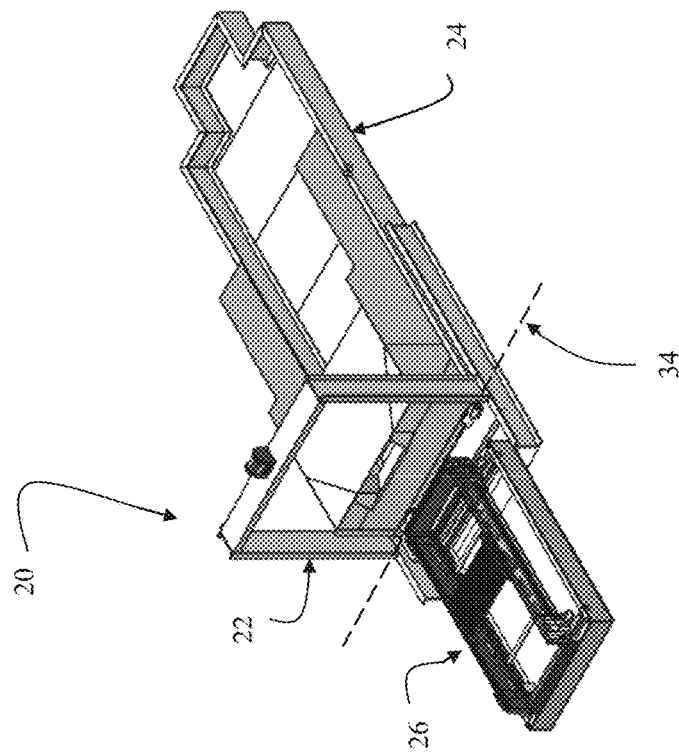
FIG. 12

ASSEMBLY WITH PIVOTABLE HOPPER AND SHAKER

CROSS REFERENCE TO RELATED APPLICATIONS

This application claims the benefit of U.S. Provisional Application No. 62/233,942, filed Sep. 28, 2015, the entire contents of which are incorporated herein by reference.

BACKGROUND

In certain applications such as construction, where it is desired to move some combination of soil, rocks, and other debris, a type of device known as a suction (or vacuum) evacuator can be used (e.g., such as may be produced by Vac-Tron Equipment LLC or McLaughlin). This is typically a vehicle that removes materials from a hole on land or removes heavy debris on land. It may produce powerful suction through a wide pipe and pass the soil and debris to a storage tank. Typically the soil and debris also includes water; either water that was present at the evacuation site or water that has been added to the site such as from water jets that are often used in suction evacuation to break up the dirt and debris.

Of course, one of the issues with such an evacuation method is how to dispose of the materials that have been evacuated. Most often, the contents of suction evacuators are eventually placed into a cement pond or other type of location/structure designed for evaporation of the water therein. Once the water is evaporated, the remaining materials can be hauled to a landfill or otherwise disposed of.

Mud recycling equipment can perform some of the above functions, but they are not designed to handle heavy rock and pieces of pavement and concrete such as may be a portion of the evacuated materials. The mud recycling equipment may become damaged if such materials are fed to the mud recycling equipment.

Shakers with input hoppers could provide some of the above functions, but they are designed in a size, shape, and geometry that do not work well with suction evacuator vehicles.

It is against this background that the techniques described herein have been developed.

SUMMARY

Disclosed herein is an assembly, that includes a support base; a shaker disposed adjacent to the support base; a hopper movably connected to the support base, the hopper defining a fluid container; and an actuator attached to the support base that applies a mechanical force to the hopper to cause the hopper to move relative to the support base, thus emptying any contents therein onto the shaker.

The shaker may be fixed relative to the support base, and the movement of the hopper may also be relative to the shaker. The actuator may include a hoist and cable that attach to the hopper. The assembly may further include a derrick that extends vertically upwardly from the support base, and wherein the actuator includes a hoist that is attached to the derrick and the actuator also includes a cable that is controlled by the hoist and which is attached to the hopper. The attachment to the hopper may be via one or more eyebolts attached to one or more walls of the hopper. The attachment to the hopper may be via a pulley mounted on a cross-strut attached between opposed side walls of the hopper. The derrick may include cross braces that are attached to the derrick and the support base. The derrick may be pivotably attached to the support base to allow the derrick to be pivoted into a position for storage and/or transport where the derrick is generally parallel with the support base.

The shaker may include a screen, a vibrator that vibrates the screen, and a collection chamber beneath the screen. The vibrating screen may allow liquids to pass therethough and fall into the collection chamber. The shaker may include a pump to drive fluids from the collection chamber. The shaker may further include a float sensor to actuate the pump. The vibrating screen may allow non-liquids to translate from a first end of the screen to a second end of the screen, where the non-liquids fall off of the screen and not into the collection chamber.

The movable connection of the hopper and the support base may be a pivotable connection that permits movement about a pivot axis. The actuator may pivot the hopper through an angle of at least 30 degrees, or at least 45 degrees. The actuator may pivot the hopper to multiple different positions.

The fluid container of the hopper may include an exit chute defined therein through which the contents of the fluid container can stream onto the shaker as the hopper is moved sufficiently to allow contents of the fluid container to reach the exit chute. The exit chute may include a grate provided therein to restrain large objects from passing through the chute. The grate may be removable so that the assembly can be operated with or without the grate in the exit chute. The hopper may be longer in a first dimension along a longitudinal axis than in a second dimension along a transverse axis. The hopper may be more than twice as long in the first dimension than in the second dimension. The longitudinal axis and the transverse axis may be generally horizontal when the hopper is in a first configuration and the longitudinal axis is tilted relative to horizontal and the transverse axis is generally horizontal when the hopper is in a second configuration. The fluid container defined by the hopper may have a first longitudinal end and an opposite, second longitudinal end. The movement of the hopper may cause the first end to be higher in elevation than the second end. The first end may be movable to a position that is at least six feet higher in elevation than the second end. The first end may be movable to a position that is at least ten feet higher in elevation than the second end. The first end may be movable to a position that is at least fourteen feet higher in elevation than the second end.

All walls of the fluid container may move as the hopper is moved relative to the support base. The hopper may include a fluid pipe to direct fluid onto one or more surfaces of the fluid container to loosen contents which may have become affixed to the one or more surfaces, and the hopper may further include a fluid pump to drive fluid through the fluid pipe.

Also disclosed is an assembly, that includes a support base; a shaker disposed adjacent to the support base; a hopper tiltably connected to the support base, the hopper defining a fluid container; and an actuator attached to the support base that applies a mechanical force to the hopper to cause the hopper to tilt relative to the support base, thus emptying any contents therein onto the shaker.

Also disclosed is an assembly, that includes a support base; a shaker disposed adjacent to the support base; a hopper movably connected to the support base, the hopper defining a fluid container, the hopper having two opposite longitudinal ends; and an actuator attached to the support base that applies a mechanical force to the hopper to cause the hopper to move relative to the support base, thus emptying any contents therein onto the shaker. In a first configuration the two longitudinal ends of the hopper are at the same height, and in a second configuration the two longitudinal ends of the hopper are at different heights relative to each other.

Also disclosed is a method, including providing a shaker having a top surface thereof; providing a hopper that defines a fluid container having a bottom surface, the hopper being movable between a first position where the bottom surface of the fluid container is located at an elevation lower than the top surface of the shaker and a second position where at least a portion of the bottom surface of the hopper is at an elevation higher than the top surface of the shaker; receiving drilling mud and related fluids in the hopper, with the hopper in the first position; and moving the hopper to the second position to cause the drilling mud and related fluids to flow onto the shaker.

The method may be devoid of using a pump to move fluid from the hopper to the shaker.

Also disclosed is an assembly for use in conjunction with a shaker, including a support base positioned in proximity to the shaker; a hopper tiltably connected to the support base, the hopper defining a fluid container; and an actuator attached to the support base that applies a mechanical force to the hopper to cause the hopper to tilt relative to the support base, thus emptying any contents therein onto the shaker.

BRIEF DESCRIPTION OF THE DRAWINGS

FIG. 12 shows the hopper of the assembly pivoted down into its normal, horizontal position and the suction evacuator leaving the scene.

DETAILED DESCRIPTION

Figure 1:
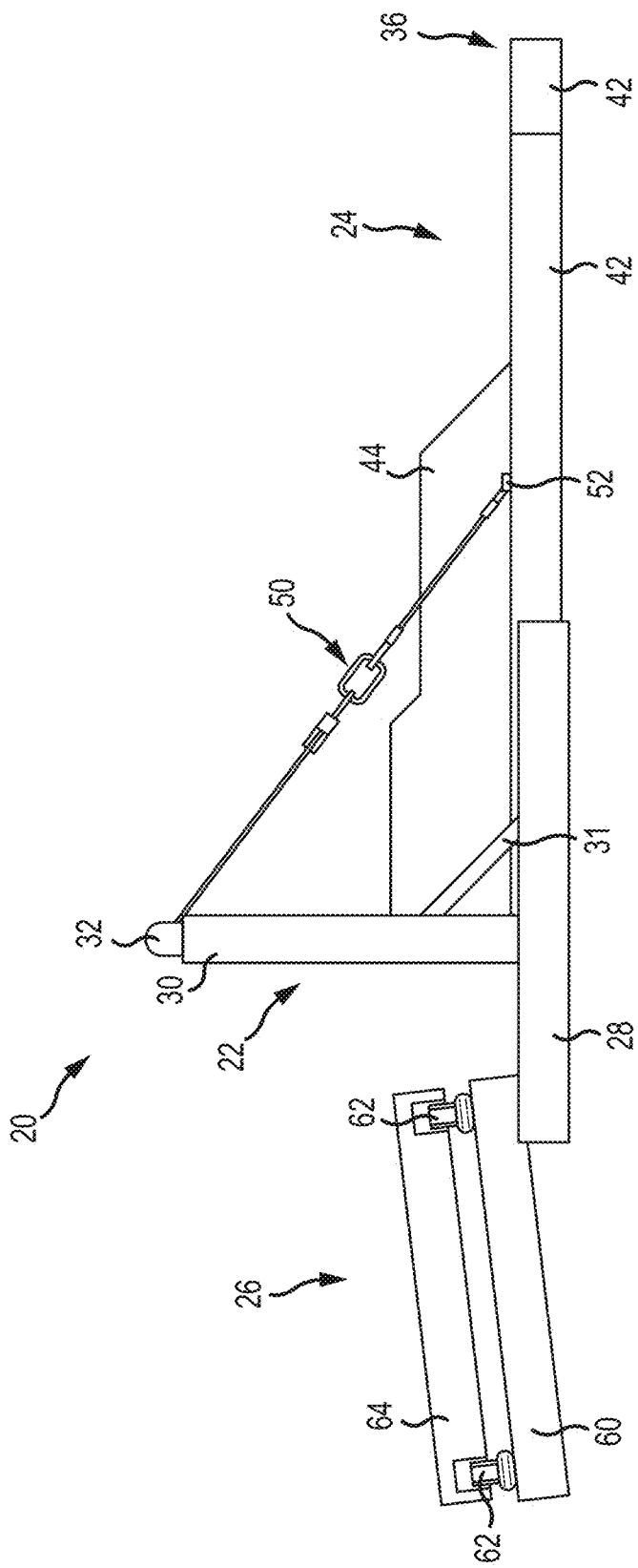
FIG. 1 is a simplified illustration of the assembly with a pivotable hopper and shaker.

While the embodiments disclosed herein are susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives of embodiments of the invention as defined by the claims. The disclosure is described with reference to the drawings, wherein like reference numbers denote substantially similar elements.

As part of addressing the problems described in the background above, it has been recognized that a novel assembly including a low-profile, pivotable hopper combined with a shaker will allow a vehicle-based suction evacuator (or other type of vehicle or container) to dump the contents of its storage tank into the hopper. The hopper can then be pivoted relative to the shaker so that the contents of the hopper are allowed to flow out of the hopper and onto the shaker. The shaker includes a shaker screen that allows liquids to pass through to a liquid container below. The screen is vibrated to cause non-liquids to move along the screen toward an exit end where the non-liquids are collected and disposed of. The liquids can be further processed by a mud recycling system if desired.

Since suction evacuators are often truck-mounted or trailer-mounted, and because the storage tank that is part of the suction evacuator is designed to pivot in order to dump out its contents, it is desirable for the container receiving the contents (in this case, the input hopper) to be no more than 15 inches (approximately 38 centimeters) high. Further, the storage tanks in suction evacuators typically have a storage capacity of up to 1200 gallons (approximately 450 liters) and often in the range of 800 gallons (approximately 300 liters).

A simplified version of a hopper/shaker assembly 20 is shown in FIG. 1. A support base 22 has a hopper 24 pivotably connected thereto and a shaker 26 on an opposite side thereof. The support base 22 includes horizontally-extending members 28 that rest on the ground and a derrick 30 that extends vertically-upwardly from the horizontally-extending members 28. One or more cross-braces 31 may provide lateral support to the derrick 30 by attaching to the horizontally-extending members 28 and the derrick 30. Although one is shown in FIG. 1, it should be understood that the other lateral side of the assembly 20 could also include a similar cross-brace which would look like a mirror image thereof. One or more hoists 32 may be located on top of the derrick 30. The support base 22 may include an axle, pins, bearings, or any other suitable structure to define and create a pivot axis 34 (see FIGS. 4-12) about which a pivotably connected component could pivot or turn.

Figure 19:
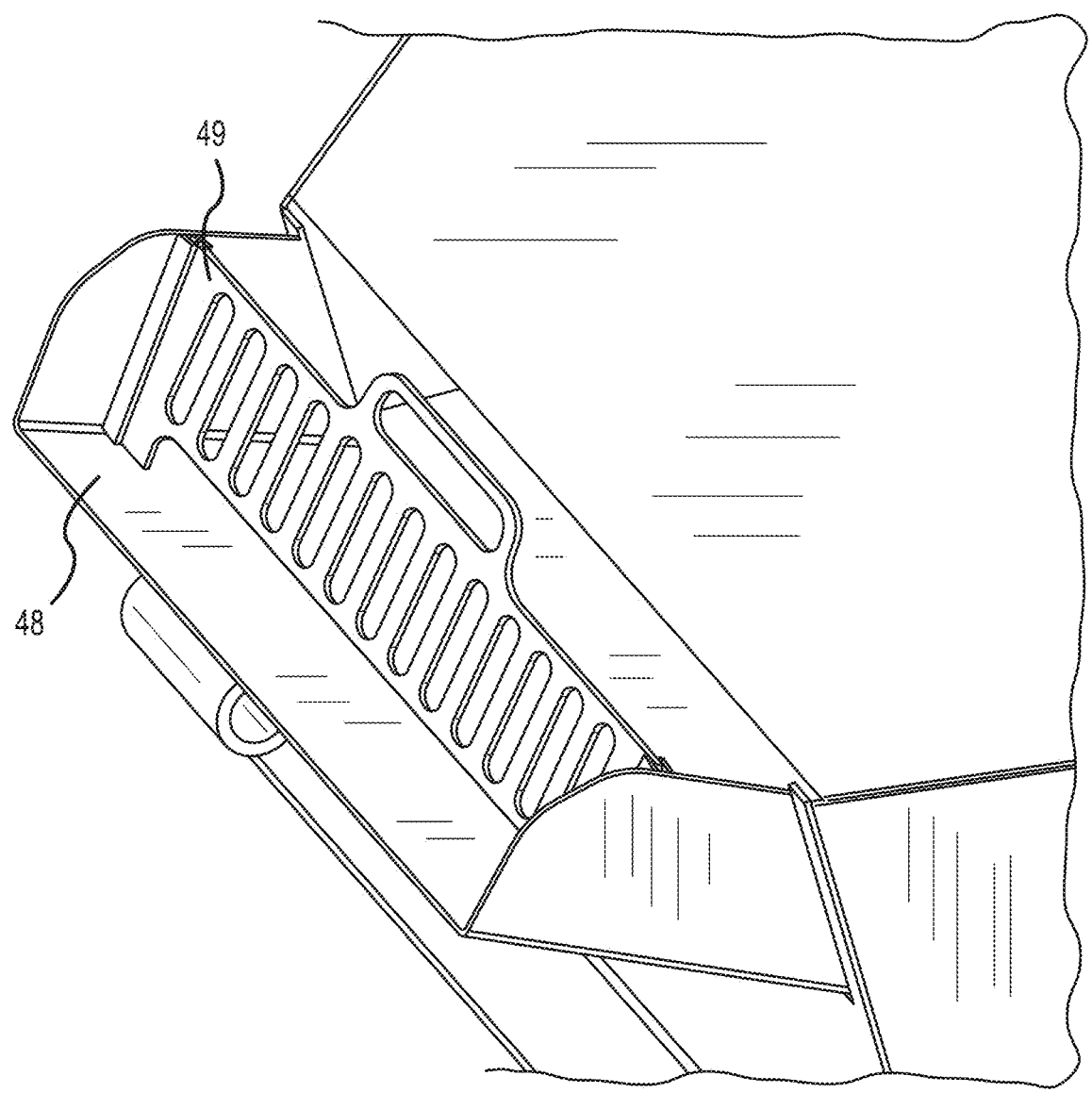
FIG. 19 shows a removable grate held in position in an exit chute of the hopper.

The hopper 24 includes a bottom surface 40 (see FIGS. 4-12) and a plurality of sidewalls 42 that together define a fluid container in the hopper 24. The hopper 24 also includes a plurality of splashguards 44 that extend upwardly from the sidewalls 42. The splashguard 46 at the longitudinal end wall of the hopper 24 includes a chute 48 defined along a top portion thereof. The chute 48 may include a removable grate 49 with fluid-passing slots defined therein, such as is shown in FIG. 19. The grate 49 can be employed in applications where large rocks and other debris may be present in the mud and other fluids, and where it would be desirable to prevent such rocks and debris from falling onto and damaging the shaker screen.

Figure 2:
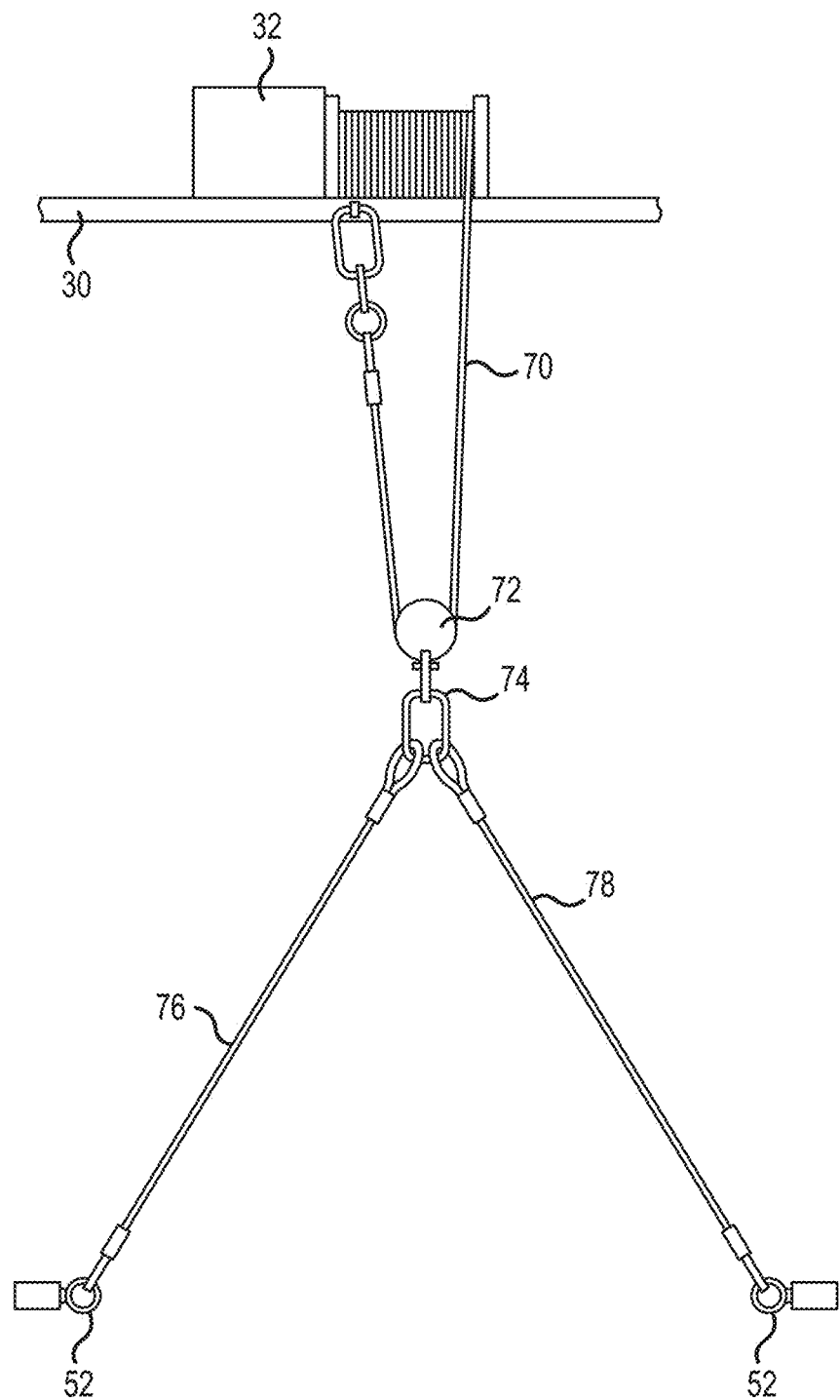
FIG. 2 is a simplified illustration of rigging associated with the assembly of FIG. 1.
Figure 16:
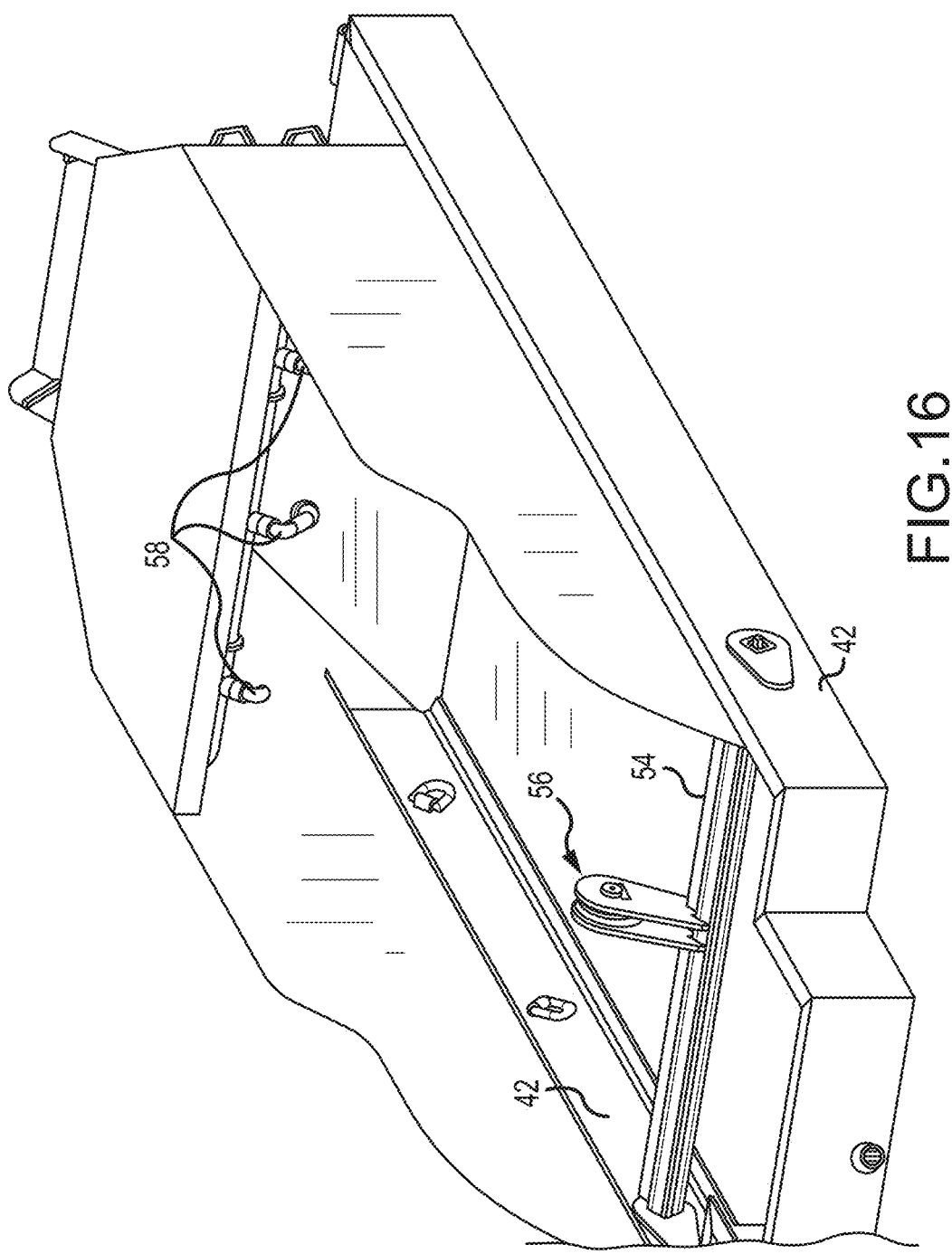
FIG. 16 shows the hopper with a pipe arrangement and with a cross-strut between the sidewalls and a pulley mounted on the cross-strut for engagement by a cable associated with a hoist.
Figure 17:
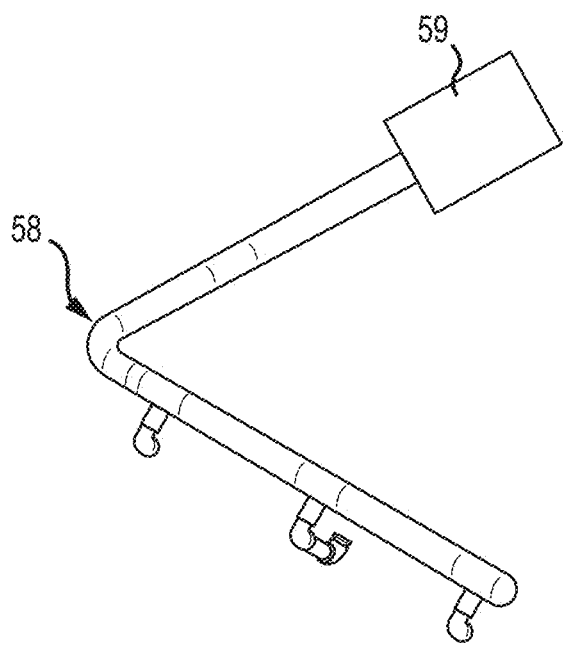
FIG. 17 shows the pipe arrangement with nozzles and with a fluid pump.

The hoist 32 on the derrick 30 may be connected to the pivotable hopper 24 via rigging 50 that attaches to suitable hardware 52 on the hopper 24. The suitable hardware 52 may include an eyebolt as is shown in FIG. 2. Alternatively, the suitable hardware can include a pulley 54 mounted on a cross-strut 56 that is attached to and between the opposed sidewalls 42, as is shown in FIG. 16.

The hopper 24 may also include mating components to the pivot-enabling components of the support base 22, such as an axle, pins, bearings, or any other suitable structure to define and create a pivot axis 34 (see FIGS. 4-12) about which it could pivot or turn relative to the support base 22.

The shaker 26 includes a fluid container 60 that supports a pair of vibrating motors 62, which in turn support a shaker screen/table 64. It is possible to either obtain a shaker from a company such as Kem-Tron/Elgin Separation Solutions, Derrick Equipment Company, or other, or to construct a shaker. Further, the vibration motors could be mounted above the shaker screen, as long as there is sufficient clearance for the debris to pass underneath the motors. Also, there may be any suitable number of vibrating motors, including just one vibrating motor.

Figure 18:
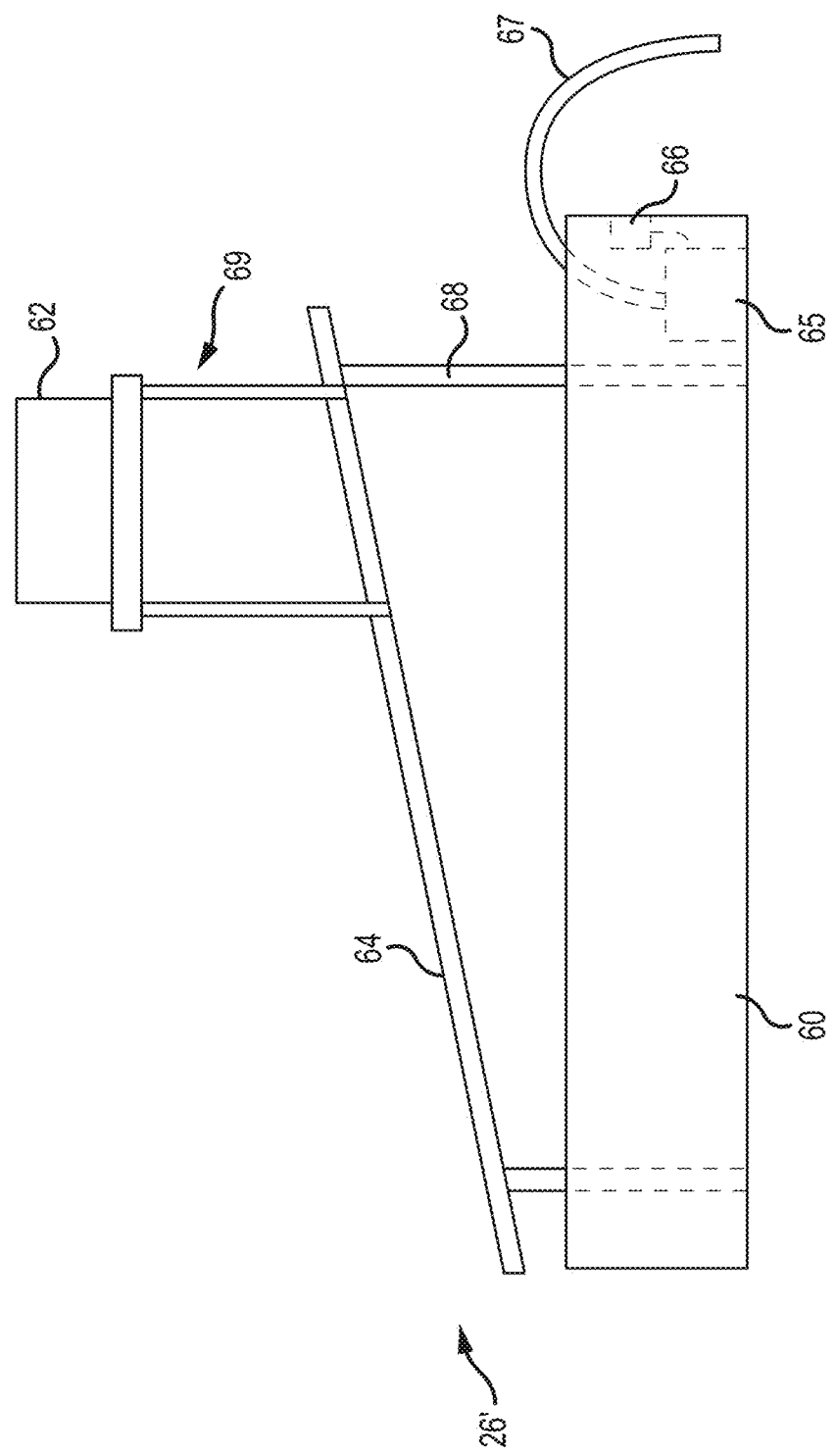
FIG. 18 shows a version of the shaker that includes vibrating motors mounted above the shaker screen, and a fluid pump and float sensor for discharging fluid from the fluid container of the shaker.

There may be a suitable outlet for the fluid container 60, or as shown in FIG. 18 there may be a trash pump 65 located therein to drive fluid out of the fluid container 60, such as via a hose 67 or other suitable conduit. The trash pump 65 may be actuated manually, it may be actuated by a float sensor 66, or it may be actuated in any other suitable fashion. The vibrating motor(s) 62 may be supported above and attached to the shaker table 64 by a suitable frame 69. The fluid that is driven from the fluid container 60 under force of gravity, by a pump, or otherwise, can be provided to a holding pit or reclaimer where it can be processed further or suitably disposed of.

A more detailed view of one embodiment of the rigging 50 (such as a sling) is shown in FIG. 2. The hoist 32 is located on top of the derrick 30. A cable 70 associated with the hoist 32 is connected at one end to the derrick 30. The cable 70 engages with a pulley 72 that is attached to a loop 74 to which an end of a first cable 76 and an end of a second cable 78 are attached. The opposite ends of the first cable 76 and second cable 78 are attached to hardware 52 on the hopper 24. In this case, the hardware 52 may be an eyebolt or the like. As may be understood, the hardware 52 could be located outside of the fluid container of the hopper 24, inside of the fluid container of the hopper 24, or some combination thereof. In the case of the alternative described above with regard to the pulley 56, the rigging could be modified suitably to mate and engage with the pulley 56, such as by merely looping the cable 70 through the pulley 56 instead of through the pulley 72 (in which case parts 52, 72, 74, 76, and 78 could be eliminated)

Figure 3:
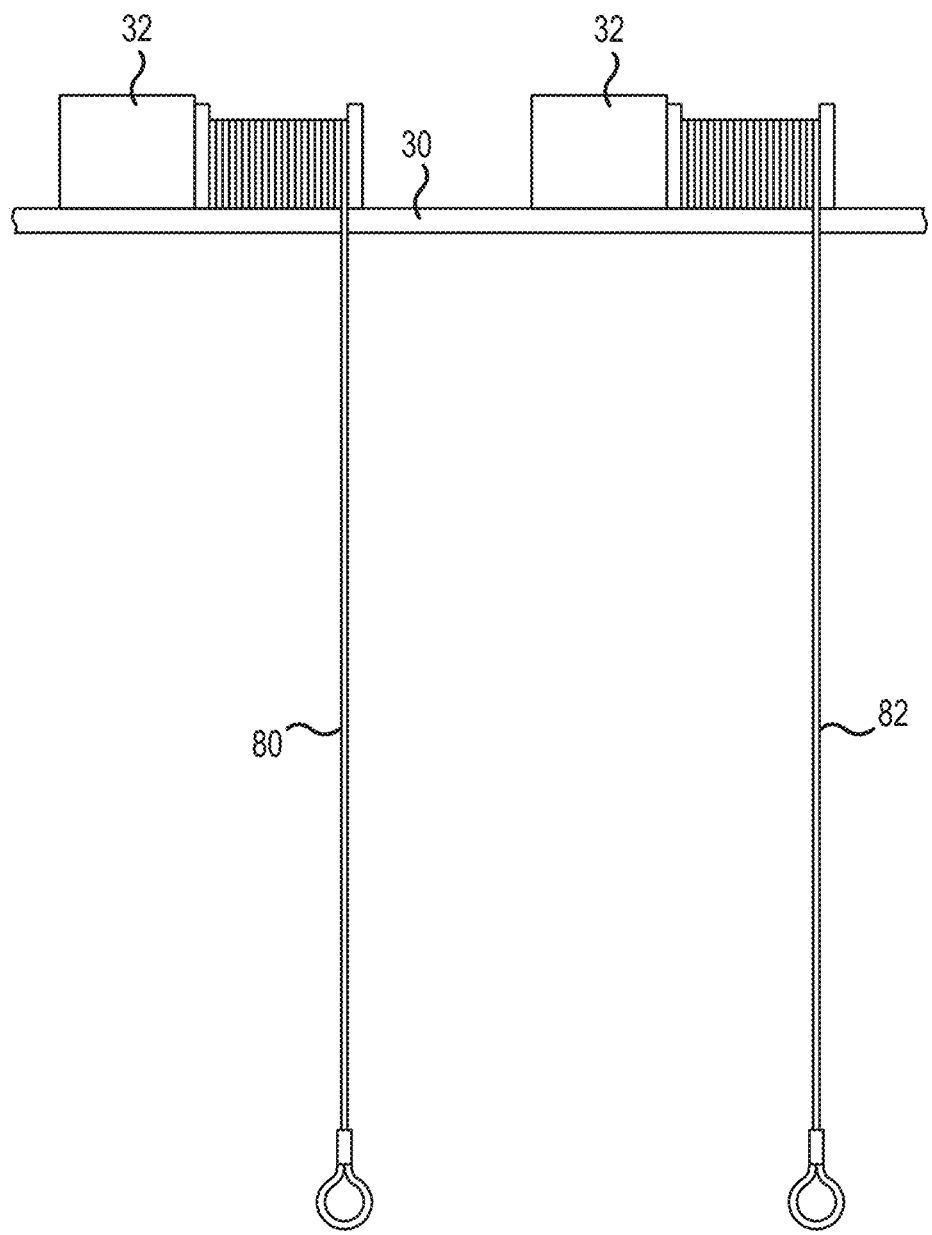
FIG. 3 is an alternative embodiment of rigging associated with the assembly of FIG. 1.

An alternative embodiment of the rigging 50 is shown in FIG. 3. In this case, there are a pair of hoists 32 on top of the derrick 30. Each of the separate hoists 32 has a cable 80 and 82, respectively, associated therewith which mates with and engages with hardware 52 on the hopper 24. It should be understood that, for ease of illustration, the rigging is not shown in every figure.

Figure 13:
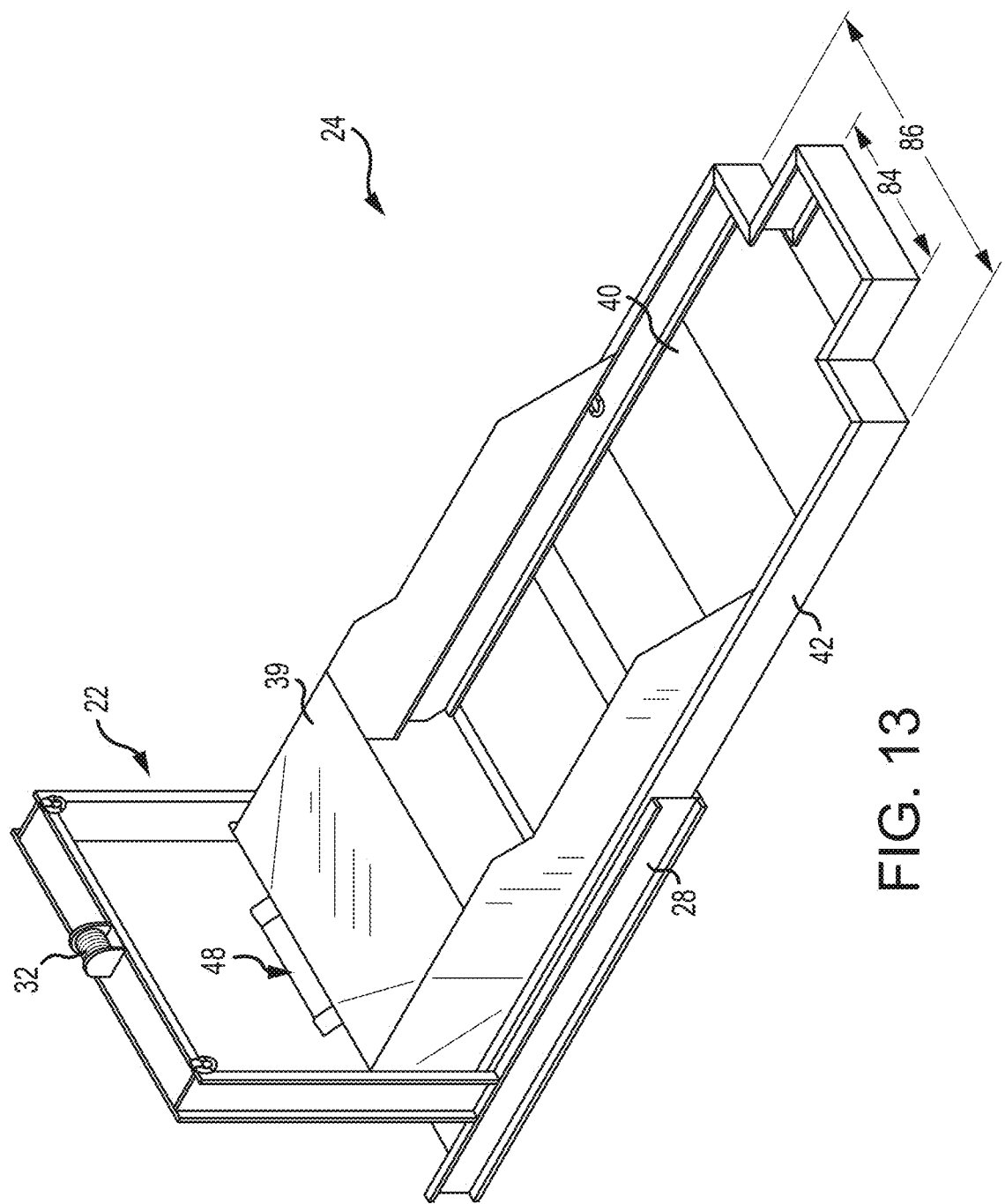
FIG. 13 shows the hopper and support base of the assembly from a different perspective angle, revealing a top wall thereof.
Figure 14:
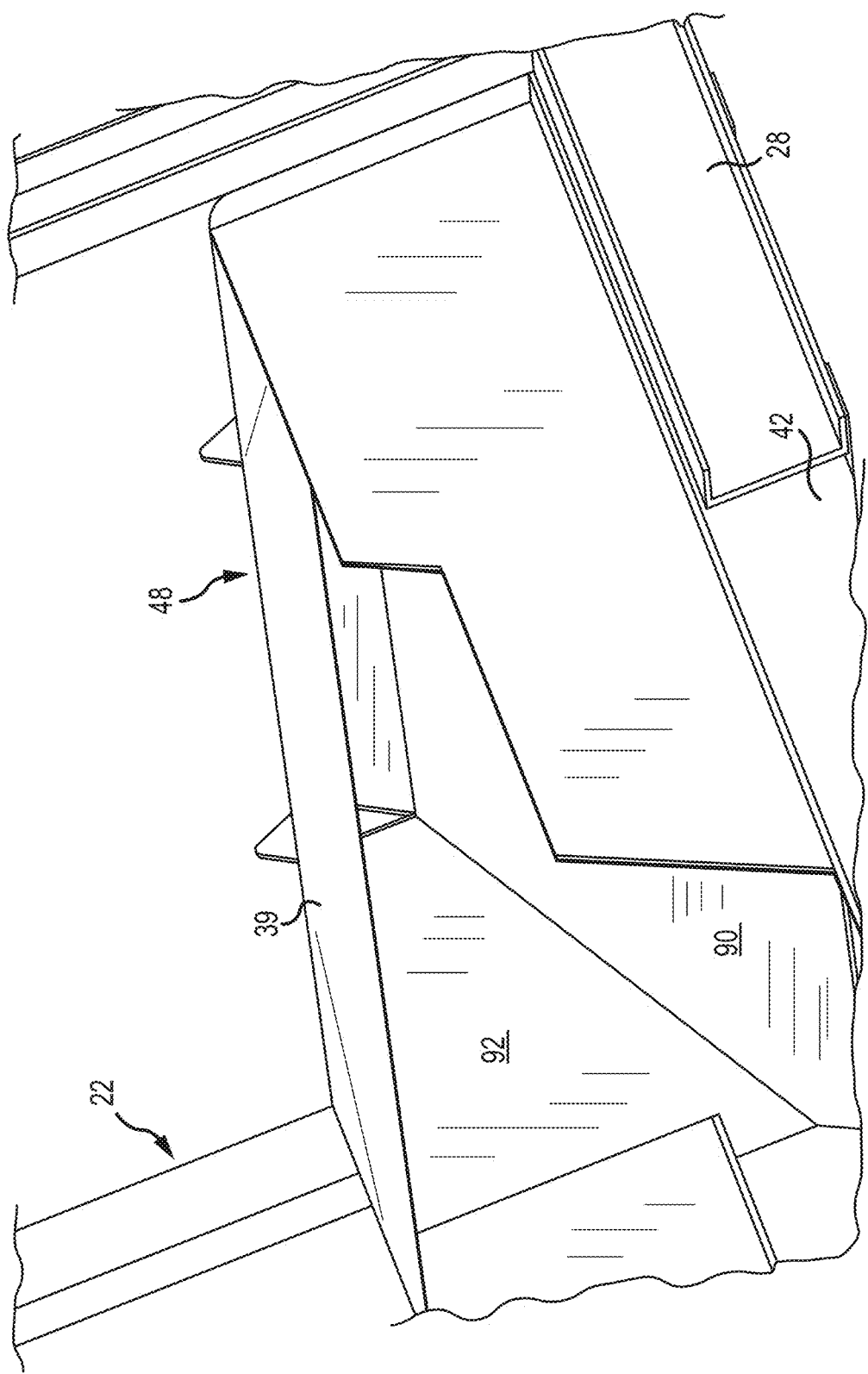
FIG. 14 is a close up of the hopper and support base of the assembly from a second, different perspective angle.
Figure 15:
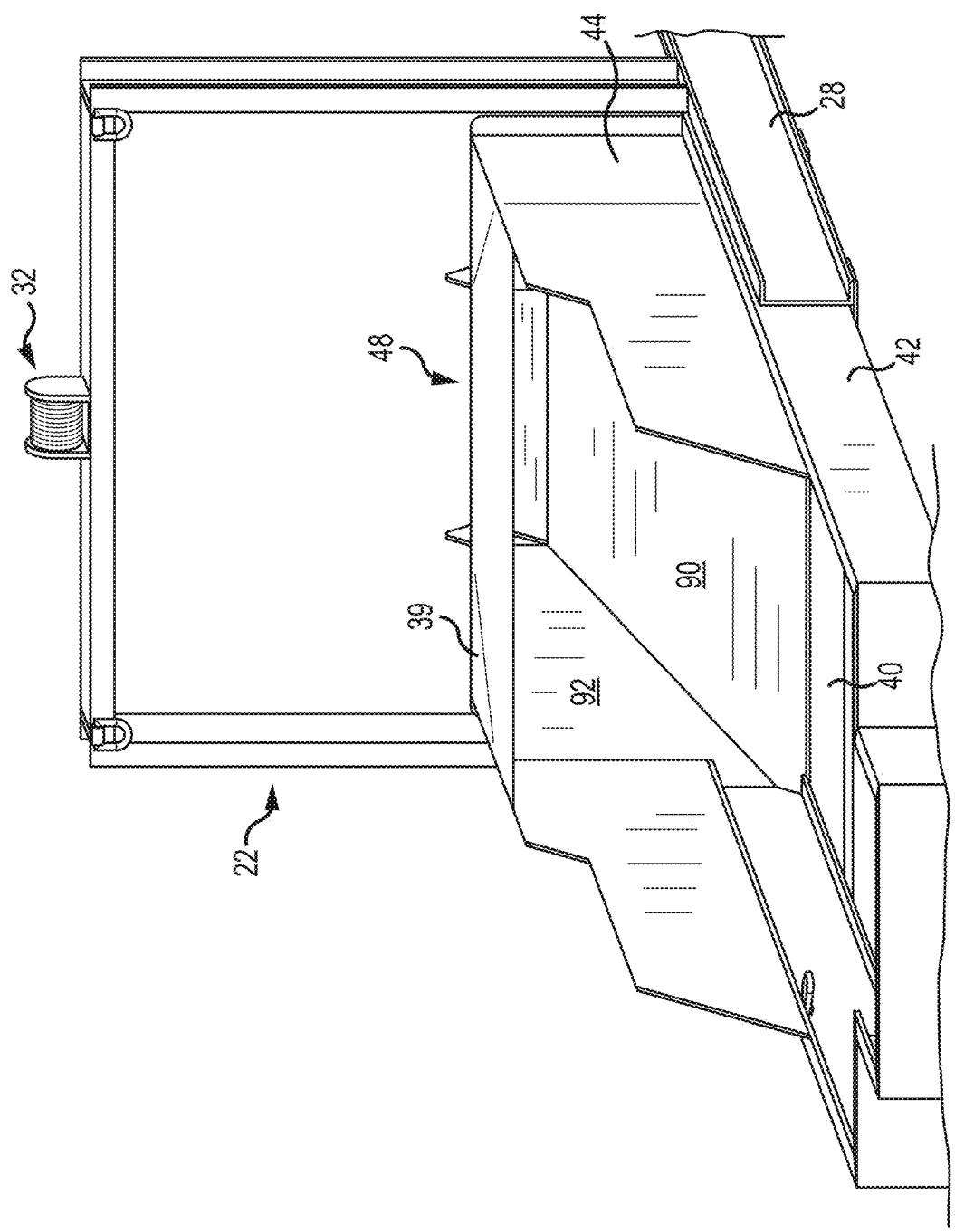
FIG. 15 shows the hopper and support base of the assembly from a third, different perspective angle.

FIGS. 13-15 show the hopper 24 and support base 22 from different angles. In these angles, one can see the presence of a top wall 39 that helps to confine the contents within the hopper 24 as the hopper is pivoted. In addition, the bottom surface 40 includes an angled portion 90 and the sidewalls and splashguards have angled portions 92 that all angle in toward the chute 48, to urge the contents toward and out the chute 48 as the hopper 24 is pivoted.

Various fluid-facing surfaces of the hopper 24 may be coated with Teflon or any other coating with non-stick properties, in order to reduce and minimize sticking of mud and any other substances to the surface of the hopper 24 when it is emptied. Alternatively, or in addition, and also to reduce and eliminate sticking, the hopper 24 may be provided with fluid pipes 58 (FIG. 16) for directing and spraying water onto various ones of the fluid-facing surfaces of the hopper 24. The fluid pipes may be fed with fluid by a pump 59, such as an electrically-driven trash pump.

Returning attention again to FIG. 1, operation of the assembly 21 will now be discussed. Once a suitable amount of material has been deposited into the fluid container defined by the hopper 24, the hoist 32 can be actuated by a human operator (or by other means). As the hoist 32 is driven to pull the rigging 50 toward the hoist, the entire hopper 24 is caused to pivot about pivot axis 34. This pivotal movement causes a longitudinal end 36 furthest from the derrick 30 to be moved to a position relatively higher than a longitudinal end 38 of the hopper 24 that is closest to the derrick 30.

As may be desired by the operator, the hoist 32 can be driven in a gradual manner and can be continuous motion or intermittent motion. The operator may wish to pivot the hopper 24 in a manner that results in a consistent flow of the contents within the hopper 24 onto the shaker 26.

As the hopper is pivoted up from its original, horizontal position, the contents therein will tend to move toward the end 38 of the hopper 24. The collection of the contents toward this end 38 is enhanced by the sidewalls 44 on the hopper 24. Collection of the contents toward this end 38 is also enhanced by the top wall 39 which helps to contain the contents within the hopper 24 and direct them toward the chute 48. The hopper 24 can be pivoted to any desired angle relative to its normal horizontal position. It has been found that pivoting the hopper 24 up to 30°, up to 45°, or even up to 50°, may be desirable in order to empty out the contents of the hopper.

After all of the contents in the hopper 24, or at least a sufficient amount of the contents therein, have been emptied onto the shaker 26, the operator can reverse the motion of the hoist 32 so as to lower the hopper 24 back into its normal, horizontal position.

Figure 4:
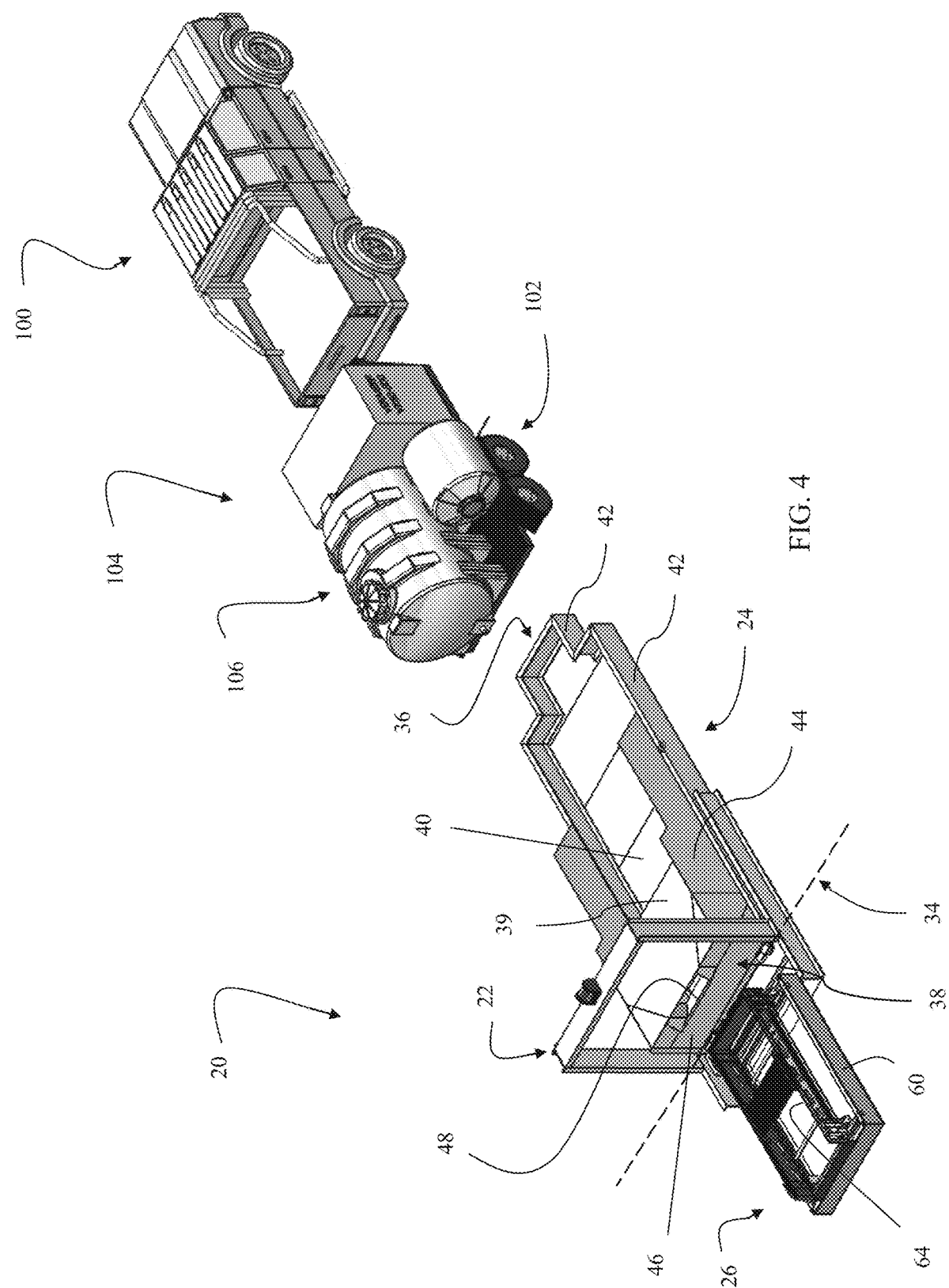
FIG. 4 is a simplified illustration of the assembly of FIG. 1 in use with a suction evacuator, showing the suction evacuator being moved into position relative to the assembly.

FIGS. 4-12 show a series of steps that may be performed in conjunction with the operation of the assembly 20. In FIG. 4, the assembly 20 is in its normal, or resting, position. A truck 100 pulling a trailer 102 with a suction evacuator 104 thereon has been backed up into position with a storage tank 106 of the evacuator near the hopper 24.

Figure 5:
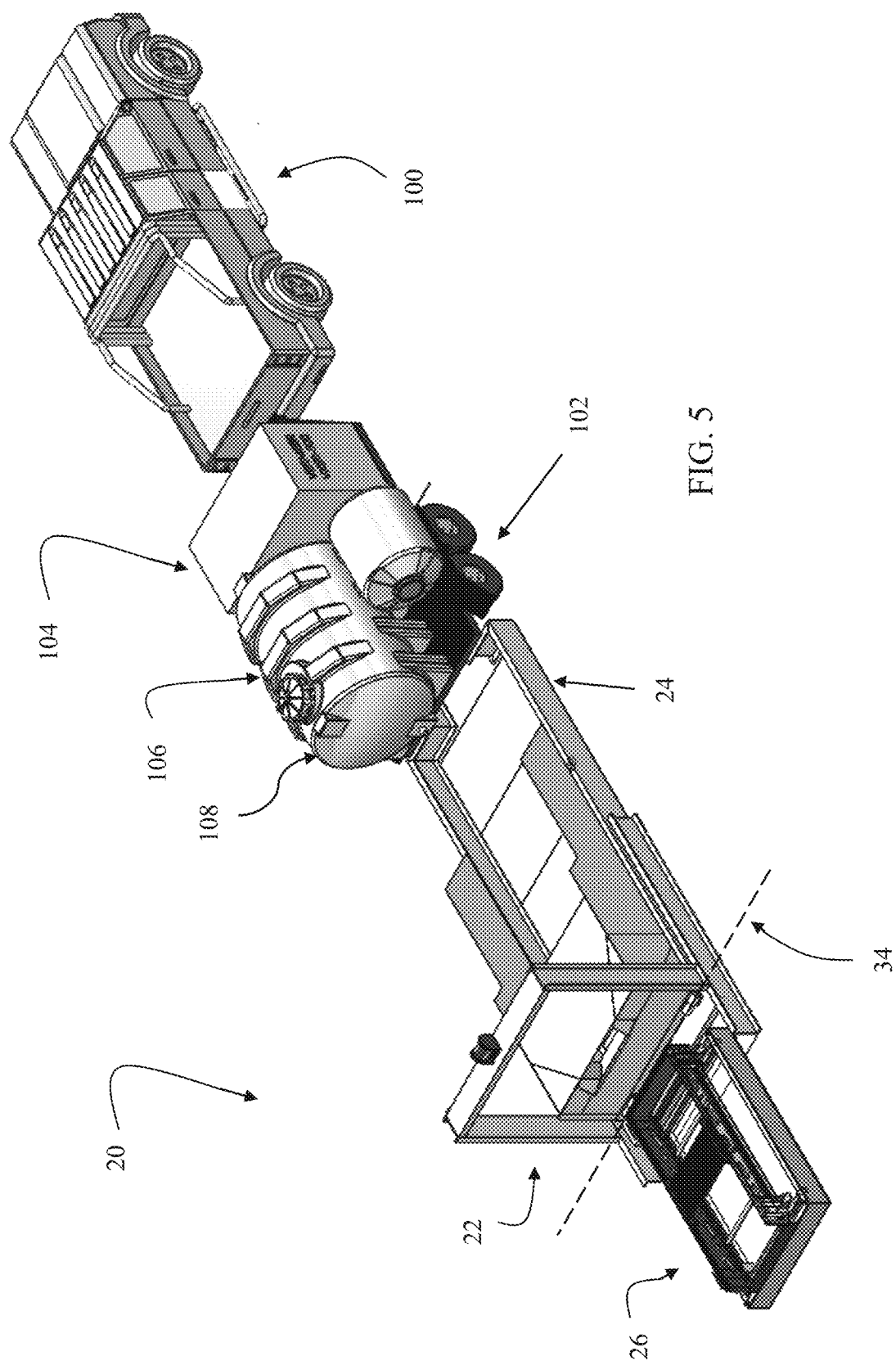
FIG. 5 is a simplified illustration of the assembly of FIG. 1 in use with the suction evacuator, showing the suction evacuator being moved into position to dump its contents into a hopper of the assembly.

FIG. 5 shows the truck 100 having backed up even further, such that an end 108 of the storage tank 106 extends over the hopper 24.

Figure 6:
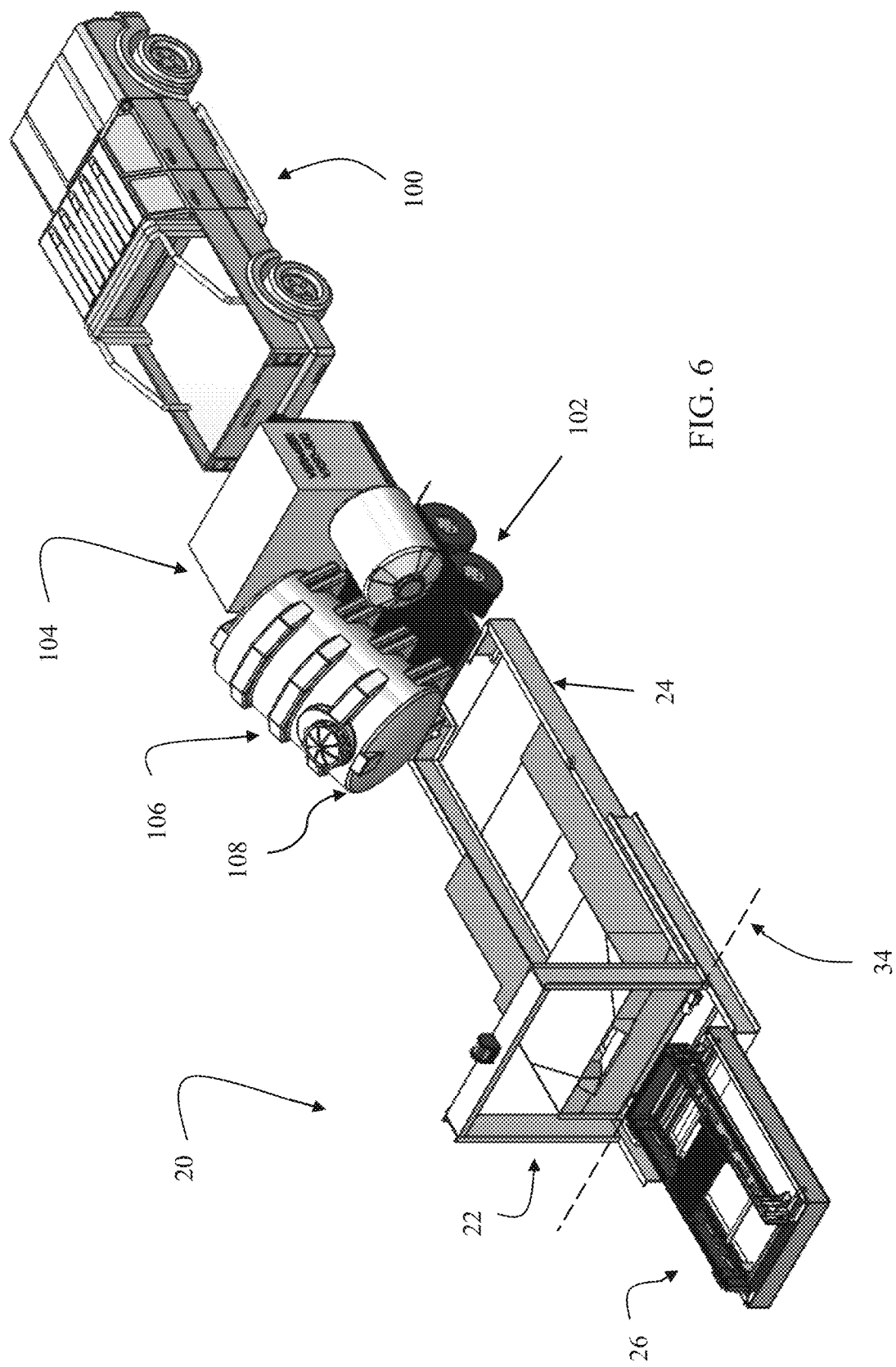
FIG. 6 is similar to FIGS. 4 and 5, showing the suction evacuator tilting into position to be able to dump its contents.

FIG. 6 shows the storage tank 106 being pivoted so that its contents can dump into the hopper 24.

Figure 7:
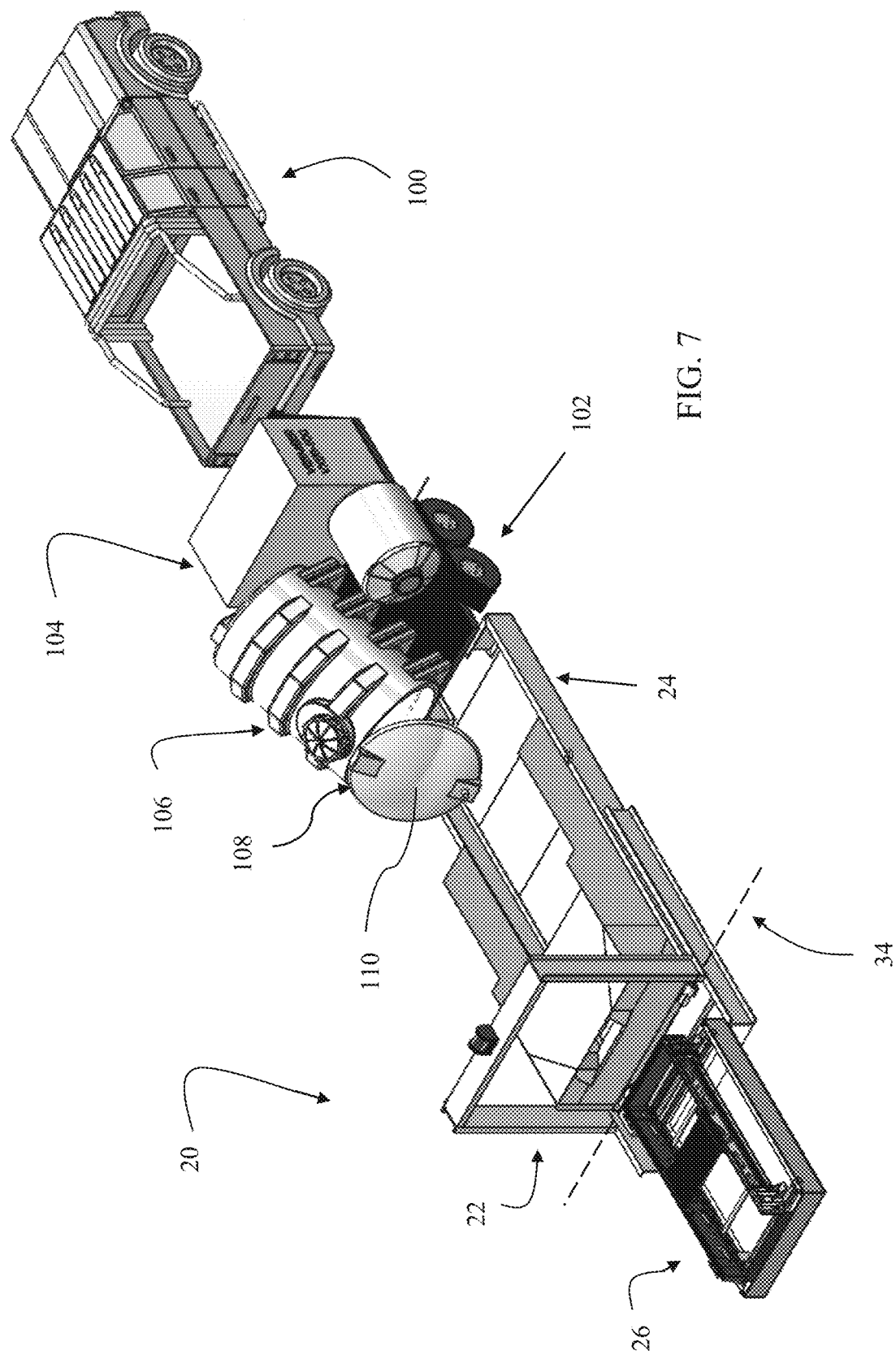
FIG. 7 is similar to FIG. 6, showing a rear door of the suction evacuator pivoting open.

In FIG. 7, a door 110 on the end 108 of the storage tank 106 has swung open, which would allow the contents of the storage tank 106 to dump into the hopper 24. Of course, a door latch (or the like) has been activated to allow the door 110 to swing open.

Figure 8:
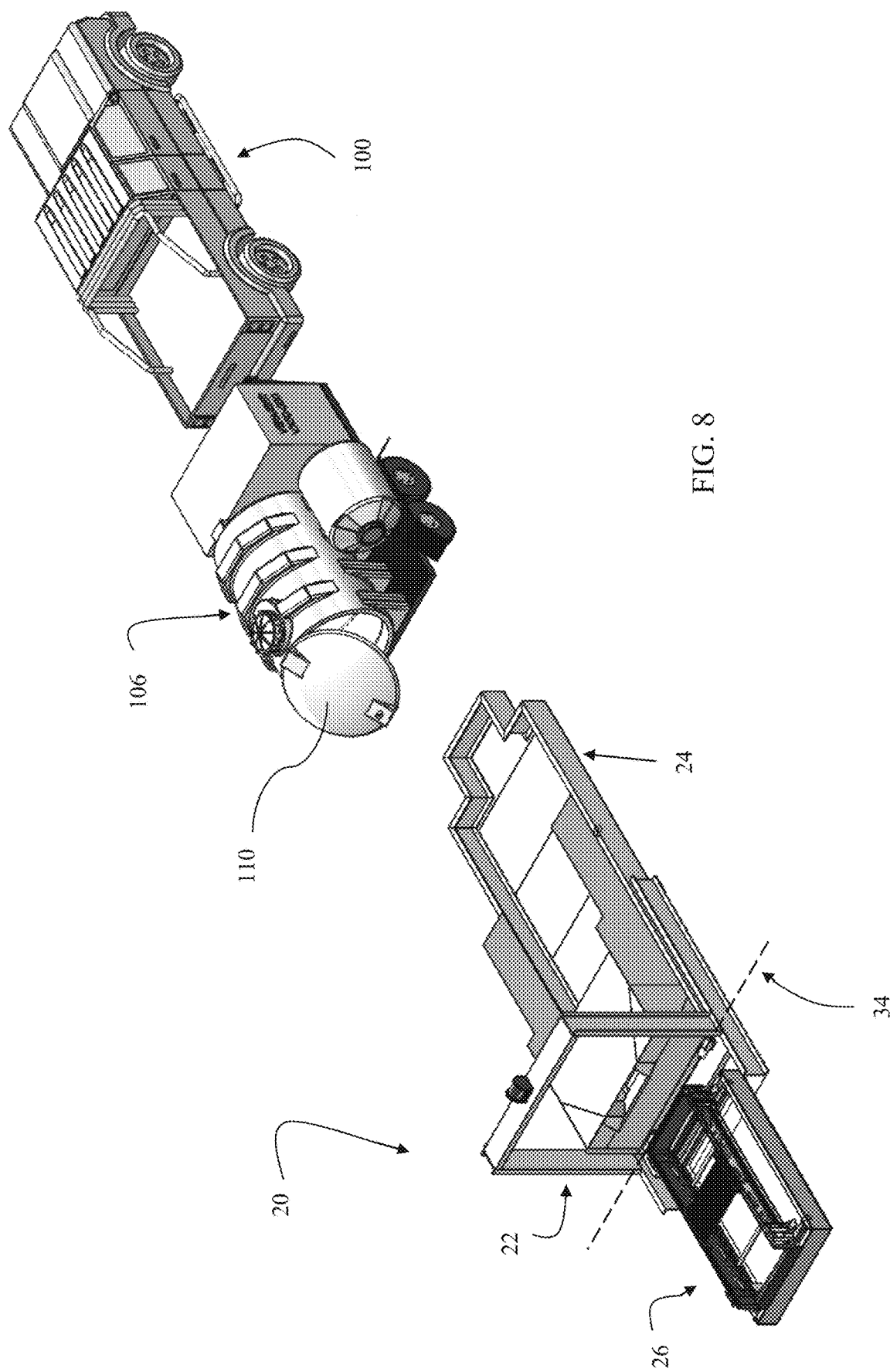
FIG. 8 is similar to FIGS. 4-7, showing the suction evacuator being pulled away from the assembly.

In FIG. 8, the storage tank 106 has been pivoted back down into its normal, horizontal position, and the truck 100 has pulled the suction evacuator 104 away from the hopper.

Figure 9:
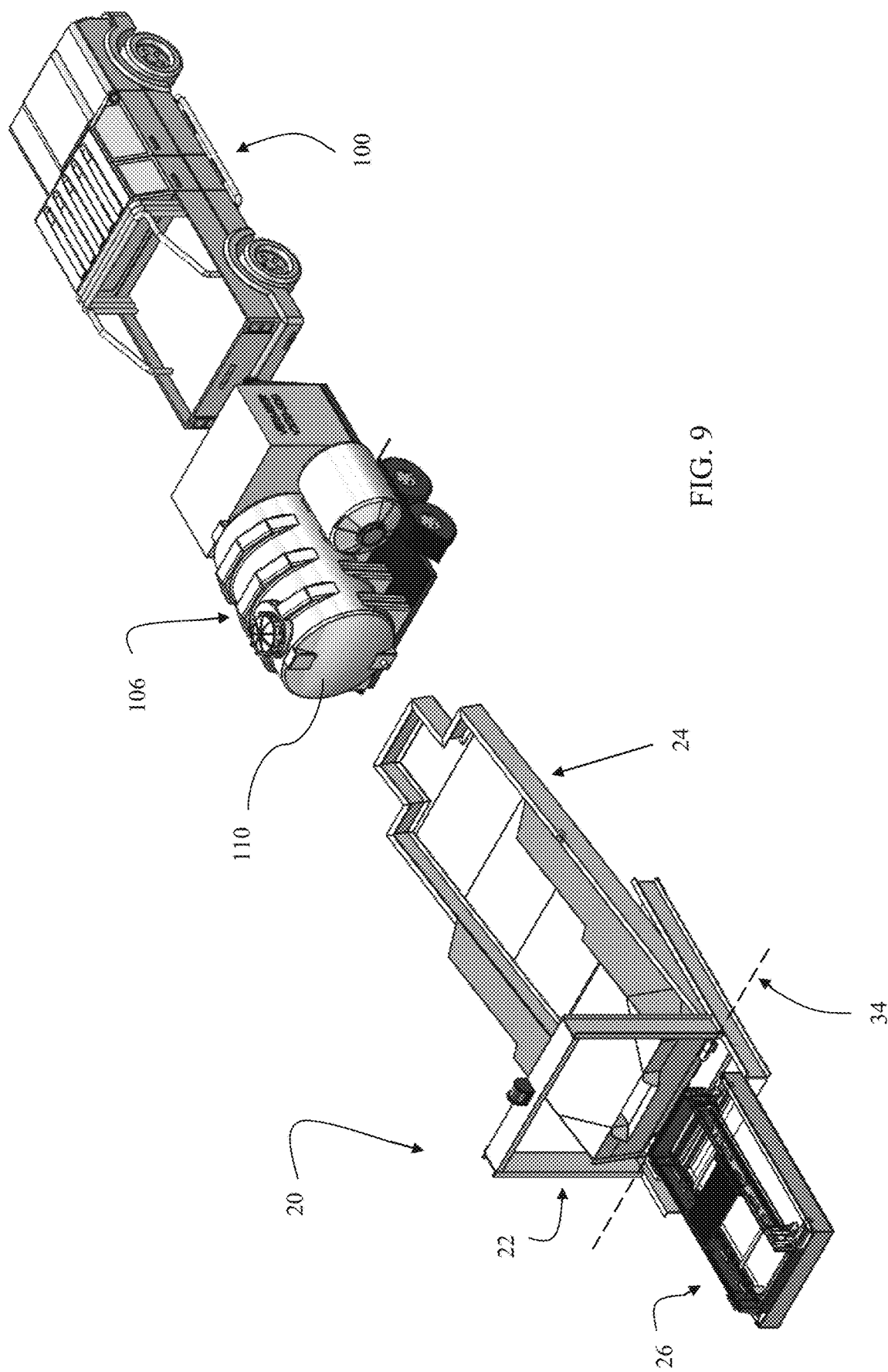
FIG. 9 shows the hopper of the assembly starting to pivot.

In FIG. 9, the hoist 32 has been operated to pivot the hopper 24 about the pivot axis 34.

Figure 10:
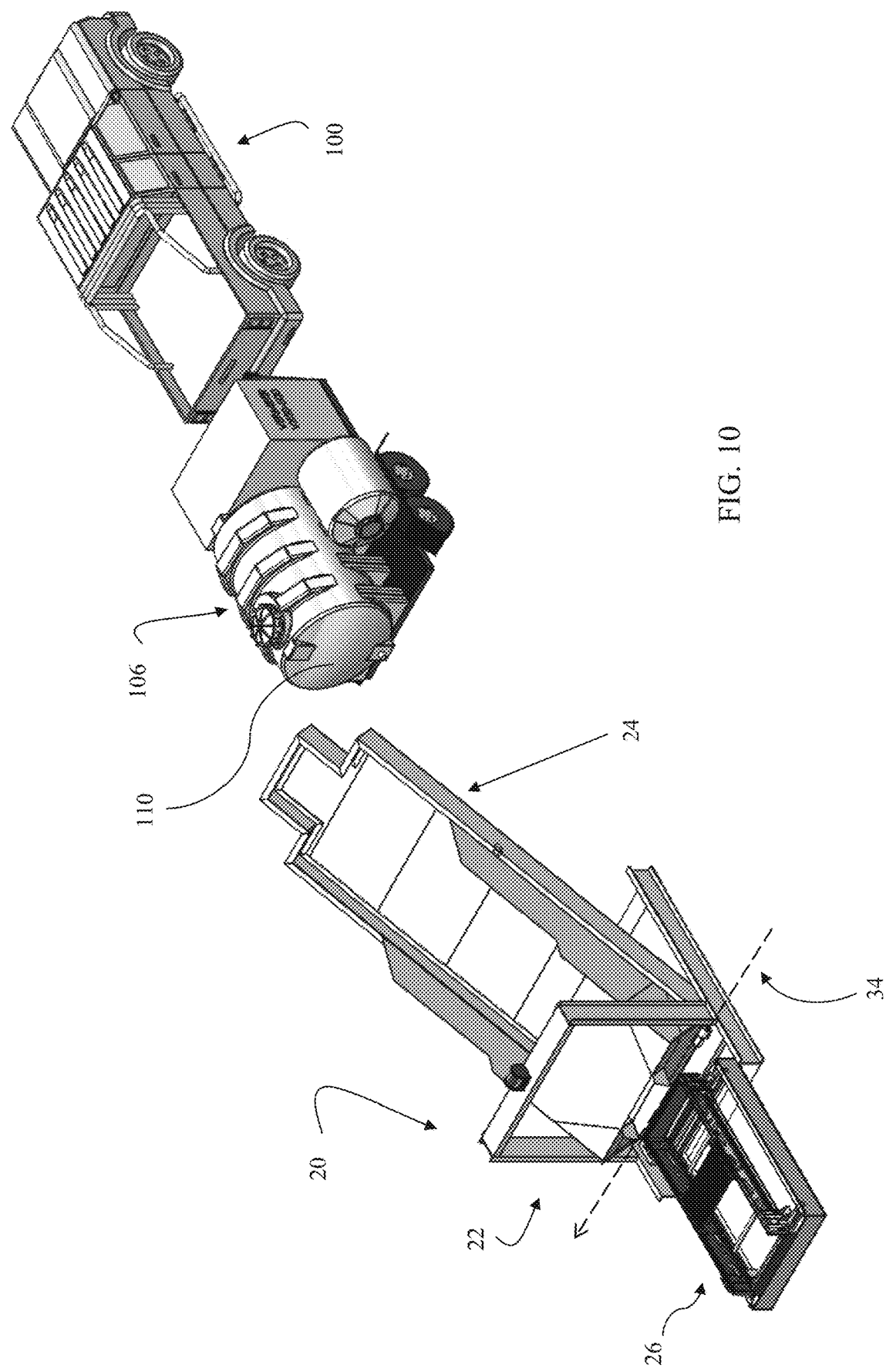
FIG. 10 shows the hopper of the assembly pivoting further than in FIG. 9.

In FIG. 10, the hopper 24 has been pivoted further about the pivot axis 34. In this position, some of the contents within the hopper 24 would be dumping on to shaker 26.

Figure 11:
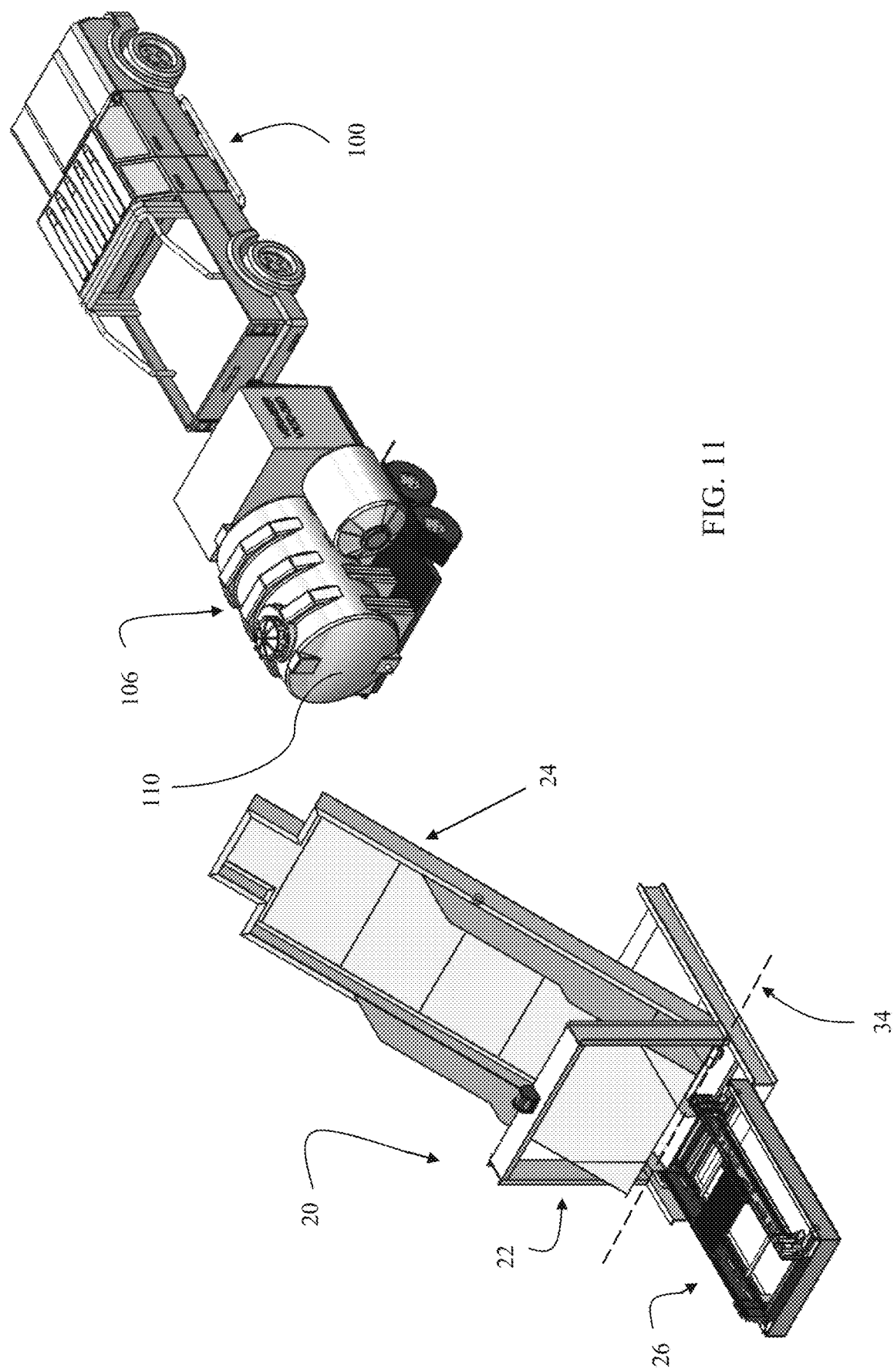
FIG. 11 shows the hopper of the assembly pivoting even further so as to dump its contents onto a shaker of the assembly.

In FIG. 11, the hopper 24 has been pivoted even further about the pivot axis 34. Depending upon the operator's preferences, this may be the highest angle that the hopper 24 is pivoted to.

In FIG. 12, the hopper 24 has been pivoted back to its normal, horizontal position and the truck 100 is driving away. Of course, the truck 100 could drive away at any earlier time after it has dumped its contents.

In one embodiment, the hopper 24 described herein could be composed of steel and could have a length of approximately 20 feet (approx. 6.1 meters), a width of approximately 7.5 feet (approx. 2.3 meters), and a height at the first end of 1.25 feet (approx. 0.38 meters), although any other suitable materials, shape, and size could be employed. For example, the hopper might have a fluid capacity of 4 to 7 kiloliters, although other suitable capacities could also be employed. The hopper 24 has a transverse axis that is parallel to (or coincident with) the pivot axis 34 and a longitudinal axis that passes through opposite ends 36 and 38. As the hopper is pivoted, its transverse axis may remain horizontal and its longitudinal axis may pivot about the pivot axis. The first end 36 of the hopper may be moved to a position that is at least 6 feet, at least 10 feet, or at least 14 feet above the second end 38 of the hopper.

Also, the first end 36 of the hopper 24 may be narrower than other portions of the hopper 24. As seen in FIG. 13, the end 36 may have a width 84 that is smaller than a width 86 of other portions of the hopper 24. This smaller width 84 creates a notch or recess in which an operator may stand, as may be desired to operate the door 110 on the storage tank 106.

Further, it should be noted, that creating a pivot axis (pivotable connection) is just one example of how to implement the teachings herein. Any other technique for movably connecting the hopper to the support base or to the shaker could also be employed. It could include a technique that tilts the hopper without pivoting the hopper about one of its ends. Further, there could be any type of movable joint between the hopper and the support base and shaker. In that regard, it could include any design that allows the hopper to be moved between a first configuration where the opposite ends of the hopper are at approximately the same height to a second configuration where one end of the hopper is higher than the other end so that the contents of the hopper move toward the other end. Also, any or all of the components of the support base, hopper, and shaker could be combined into one integral unit or they could be completely separated from each other. Further, the support base could be eliminated.

Figure 20:
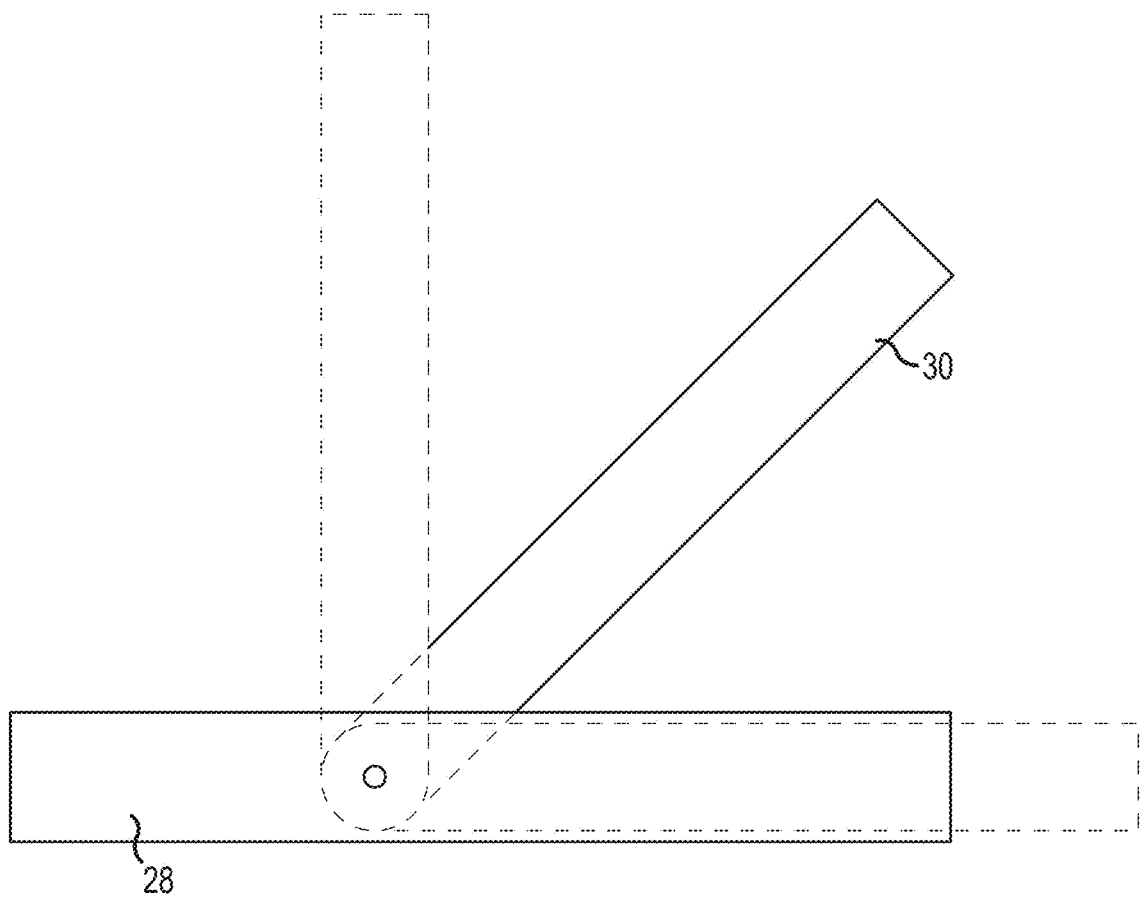
FIG. 20 shows the pivotable nature of the connection of the derrick to the support base.

In one embodiment, the derrick may be removable from the remainder of the support base. In another embodiment, the derrick 30 is pivotably mounted to the support base 28 (as shown in FIG. 20). Either of these approaches may make it possible for the entire assembly to be packed into a standard shipping container. In addition, in order to strengthen the derrick to withstand the forces due to the action of the hoist and the weight of the hopper and the contents therein, any of various techniques could be used. One non-limiting example could be the use of one or more cross-braces between the derrick and the remainder of the support base.

In at least one embodiment, it may be both desirable and possible for the hopper to be "inched" along gradually to multiple different positions (and temporarily held in each of those positions) to gradually cause the contents to be poured onto the shaker. In one embodiment, the entire process of dumping the contents of the storage tank of a suction evacuator into the hopper, slowly advancing the hopper to discharge the contents onto the shaker, and returning the hopper to its original position may take approximately 30 minutes, approximately 20 minutes, approximately 10 minutes, or even less.

One example of a suitable hoist may be one of the more powerful Warn hoists. Further, the hoist may be operable by a user/operator via a tether control coming off of the power cord. The liquid container of the shaker can be emptied by any suitable technique, but one such technique may be to use a trash pump and a hose. One or more electrical generators may be needed to power one or more of the hoist and shaker. It may also be possible to supply one or more batteries on the assembly, at least for powering the hoist. Optionally, there may be two separate controls for the hoist, one on either side of the derrick, or there may be connections so that a control mechanism can be connected from either side of the derrick. There may also be a load sensor (internal or external) associated with the hoist or cable to warn the operator or to automatically shut off the hoist if a maximum load is encountered (e.g., 33,000 pounds (15,000 kilograms)).

In order to provide great flexibility as to situations where the system can be operated, all mechanisms within the system may be powered with electrical power. Further, the type(s) of electrical power required may be those produced by a portable generator, such as may be driven with a gasoline or diesel powered engine. Alternatively, the electrical power requirements may be such as are readily available in many commercial, industrial, hydrocarbon production, or other locations (e.g., 480-volt 3-phase power or higher-amperage 220-volt). In some such cases, the electrical connection to the system can be hard-wired into the grid of the job site or otherwise connected.

While the embodiments of the invention have been illustrated and described in detail in the drawings and foregoing description, such illustration and description are to be considered as examples and not restrictive in character. For example, certain embodiments described hereinabove may be combinable with other described embodiments and/or arranged in other ways (e.g., process elements may be performed in other sequences). Accordingly, it should be understood that only example embodiments and variants thereof have been shown and described.

We claim:

1. An assembly, comprising:
   a support base;
   a shaker connected to the support base, wherein the shaker comprises a screen, a vibrator that vibrates the screen, and a collection chamber beneath the screen;
   a hopper movably connected to the support base, the hopper comprising:
   a first hopper end and a second hopper end that are spaced along a longitudinal axis of the hopper, wherein the first hopper end comprises a first end wall, wherein the second hopper end comprises a second end wall, and wherein the second hopper end is proximate the shaker and comprises an exit chute;

a bottom;

first and second hopper sides that are spaced in a width dimension of the hopper, wherein the bottom, the first hopper side, the second hopper side, the first end wall, and the second end wall collectively define a fluid container; and a top wall extending between the first and second hopper sides at the second hopper end; and an actuator attached to the support base that applies a mechanical force to the hopper to cause the hopper to move relative to the support base to dispose the first hopper end at higher elevation than the second hopper end, thus emptying any contents therein onto the screen of the shaker through the exit chute of the hopper.

2. An assembly as defined in claim 1, wherein the hopper is also moved relative to the shaker by the actuator.

3. An assembly as defined in claim 1, wherein the assembly further includes a derrick that extends vertically upwardly from the support base, and wherein the actuator includes a hoist that is attached to the derrick and the actuator also includes a cable that is controlled by the hoist and which is attached to the hopper.

4. An assembly as defined in claim 3, wherein the derrick is pivotably attached to the support base to allow the derrick to be pivoted into a position for storage and/or transport where the derrick is generally parallel with the support base.

5. An assembly as defined in claim 1, wherein the screen allows liquids to pass therethough and fall into the collection chamber.

6. An assembly as defined in claim 5, wherein the shaker includes a pump to drive fluids from the collection chamber.

7. An assembly as defined in claim 6, wherein the shaker further includes a float sensor to actuate the pump.

8. An assembly as defined in claim 1, wherein the screen allows non-liquids to translate from a first end of the screen to a second end of the screen, where the non-liquids fall off of the screen and not into the collection chamber, wherein the first end of the screen and the second hopper end are proximate one another and with the shaker proceeding away from the second hopper end to the second end of the screen.

9. An assembly as defined in claim 8, wherein the first end of the screen is disposed at a higher elevation than the second end of the screen.

10. An assembly as defined in claim 1, wherein the movable connection of the hopper and the support base is a pivotable connection that permits movement about a pivot axis, and wherein the actuator can pivot the hopper through an angle of at least 45 degrees.

11. An assembly as defined in claim 1, wherein the exit chute of the hopper is proximate an intersection between the second end wall of the hopper and the top wall of the hopper.

12. An assembly as defined in claim 11, wherein the exit chute extends beyond the second end wall of the hopper in a direction of the shaker.

13. An assembly as defined in claim 1, wherein a spacing between the first and second hopper ends is more than twice as large as a spacing between the first and second hopper sides.

14. An assembly as defined in claim 13, wherein the longitudinal axis and a transverse axis are generally horizontal when the hopper is in a first configuration and the longitudinal axis is tilted relative to horizontal and the transverse axis is generally horizontal when the hopper is in a second configuration, wherein the transverse axis coincides with the width dimension of the hopper.

15. An assembly as defined in claim 1, wherein the first hopper end is movable to a position that is at least ten feet higher in elevation than the second hopper end.

16. An assembly as defined in claim 1, wherein all walls of the fluid container move as the hopper is moved relative to the support base.

17. An assembly as defined in claim 1, wherein the hopper includes a fluid pipe to direct fluid onto one or more surfaces of the fluid container to loosen contents which may have become affixed to the one or more surfaces, and the hopper further includes a fluid pump to drive fluid through the fluid pipe.

18. An assembly as defined in claim 1, wherein the assembly further includes a derrick, wherein an upper end of the derrick is disposed at a higher elevation than an entirety of the hopper when the longitudinal axis of the hopper is disposed in a horizontal orientation, and wherein the actuator includes a hoist that is attached to the derrick.

19. As assembly as defined in claim 18, wherein the actuator further includes a cable that extends between the hoist and the hopper, wherein the cable extends downwardly from the hoist to the hopper when the longitudinal axis of the hopper is disposed in the horizontal orientation.

20. An assembly as defined in claim 18, wherein the first hopper end is spaced further from the derrick along the longitudinal axis of the hopper compared to the second hopper end when the longitudinal axis of the hopper is disposed in the horizontal orientation.

21. An assembly as defined in claim 1, wherein the bottom comprises an angled portion that extends downwardly proceeding in a direction of said first hopper end when the longitudinal axis of the hopper is disposed in a horizontal orientation.

22. An assembly as defined in claim 21, wherein the hopper comprises a first angled portion that extends from a first end of the exit chute at the second end wall to the first hopper side in diverging relation to the longitudinal axis of the hopper, and a second angled portion that extends from a second end of the exit chute at the second end wall to the second hopper side in diverging relation to the longitudinal axis of the hopper, wherein the first and second ends of the exit chute are opposite of one another and with said first end of the exit chute being closer to the first hopper side than the second end of the exit chute.

23. An assembly as defined in claim 1, wherein the hopper comprises a first angled portion that extends from a first end of the exit chute at the second end wall to the first hopper side in diverging relation to the longitudinal axis of the hopper, and a second angled portion that extends from a second end of the exit chute at the second end wall to the second hopper side in diverging relation to the longitudinal axis of the hopper, wherein the first and second ends of the exit chute are opposite of one another and with said first end of the exit chute being closer to the first hopper side than the second end of the exit chute.

24. An assembly as defined in claim 1, wherein the hopper comprises a first hopper section, a second hopper section, and a third hopper section that each extend along different portions of the longitudinal axis of the hopper and with the third hopper section being located between the first hopper section and the second hopper section along the longitudinal axis of the hopper, wherein the first and second hopper sides of the first hopper section are of a constant first height along an entirety of a length of the first hopper section, wherein the first and second hopper sides of the second hopper section are of a constant second height along an entirety of a length of the second hopper section, wherein the first and second hopper sides of the third hopper section are of a constant third height along an entirety of a length of the third hopper section, wherein the third height is greater than first height, wherein the second height is greater than the third height, and wherein an upper end of the first and second hopper sides of the first hopper section are parallel to the upper end of the first and second hopper sides of both the second hopper section and the third hopper section.

25. An assembly as defined in claim 24, wherein the first hopper section comprises the first hopper end and the second hopper section comprises the second hopper end such that the second hopper section comprises the top wall.

* * * * *